Jan. 2, 1968   P. F. GIRARD ETAL   3,361,388
DEMOUNTABLE AIRCRAFT WITH FLEXIBLE WING
Filed March 7, 1966   4 Sheets-Sheet 1

INVENTORS
PETER F. GIRARD
FRED LANDGRAF
BY Knox & Knox

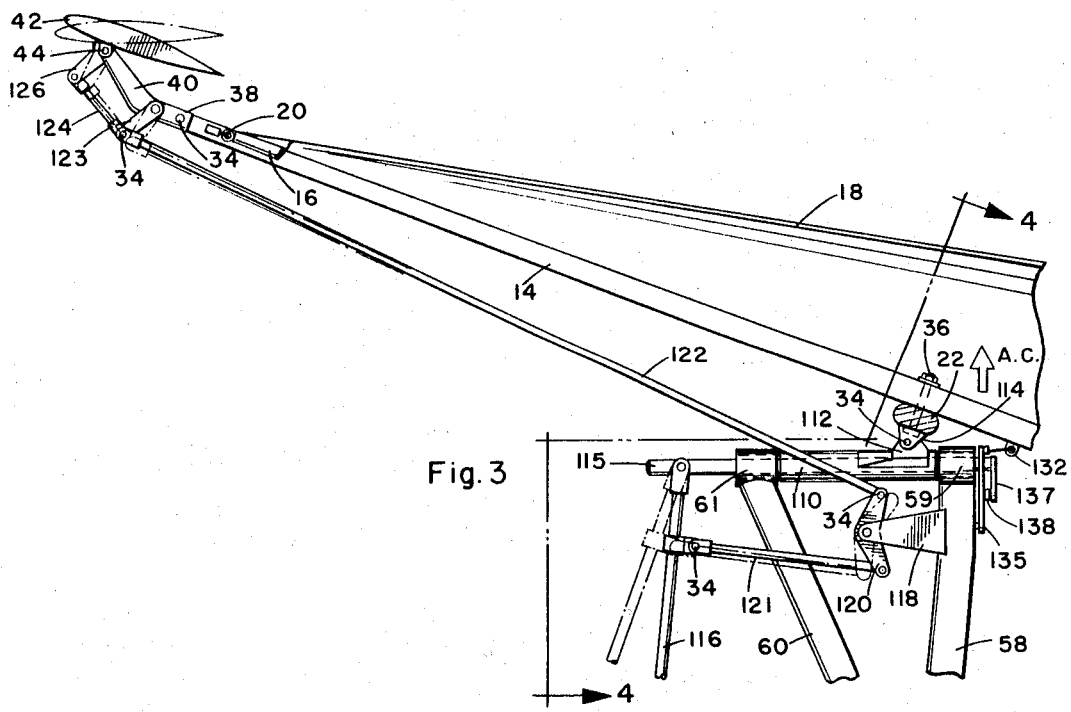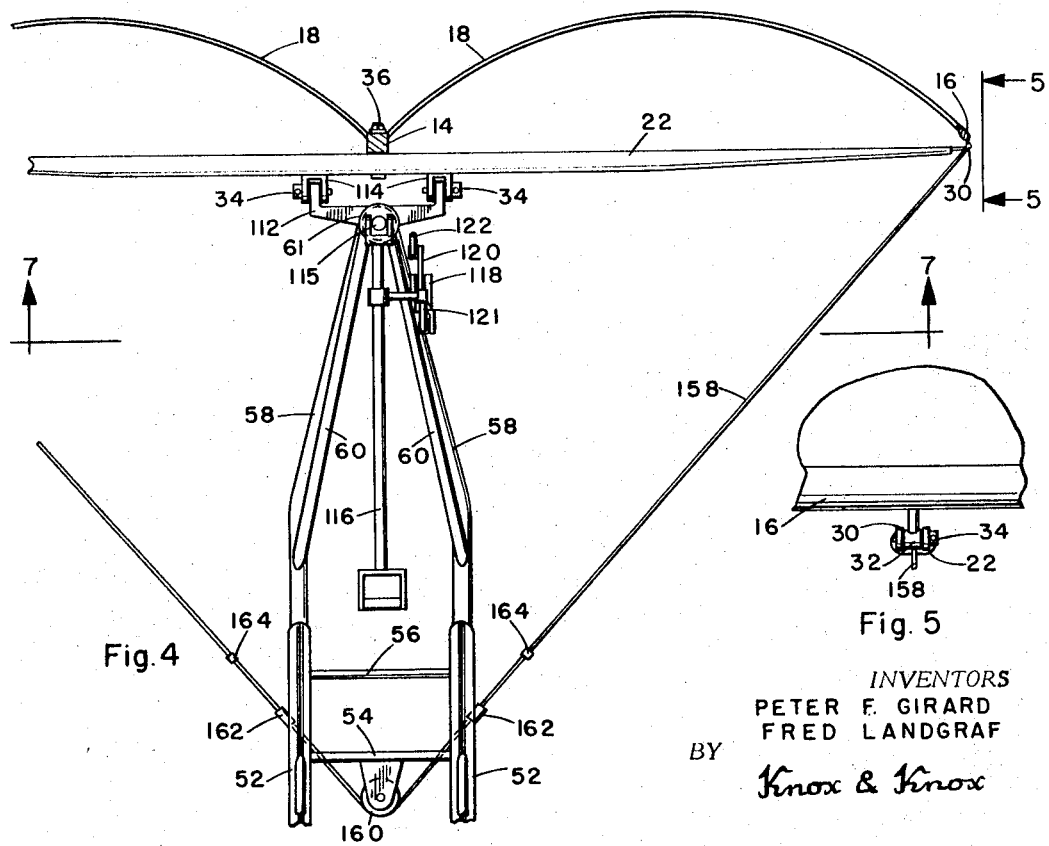

Jan. 2, 1968     P. F. GIRARD ETAL     3,361,388
DEMOUNTABLE AIRCRAFT WITH FLEXIBLE WING
Filed March 7, 1966     4 Sheets-Sheet 3
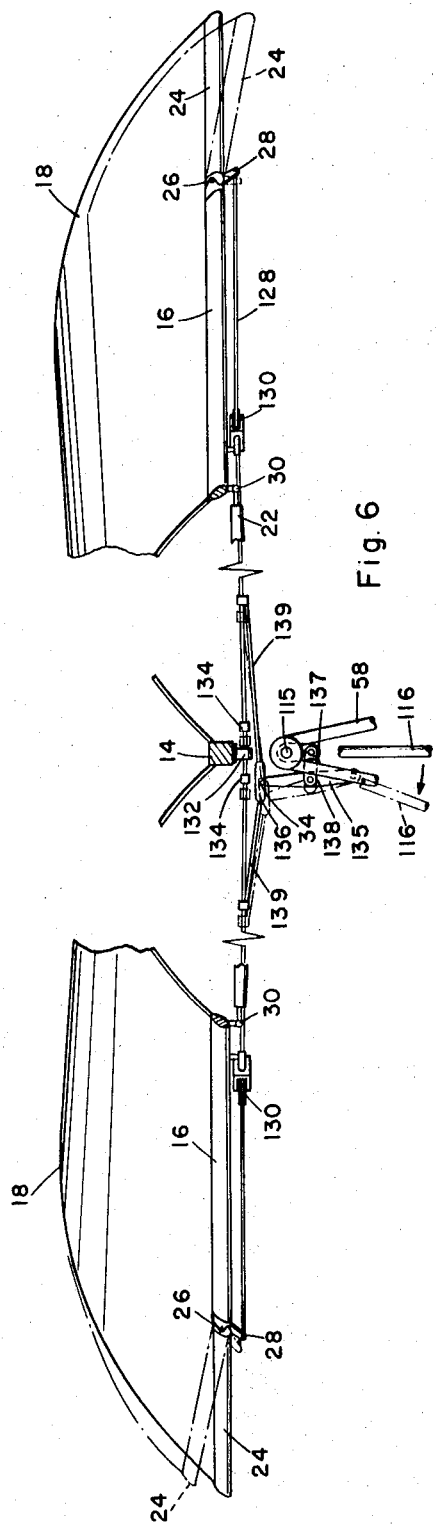
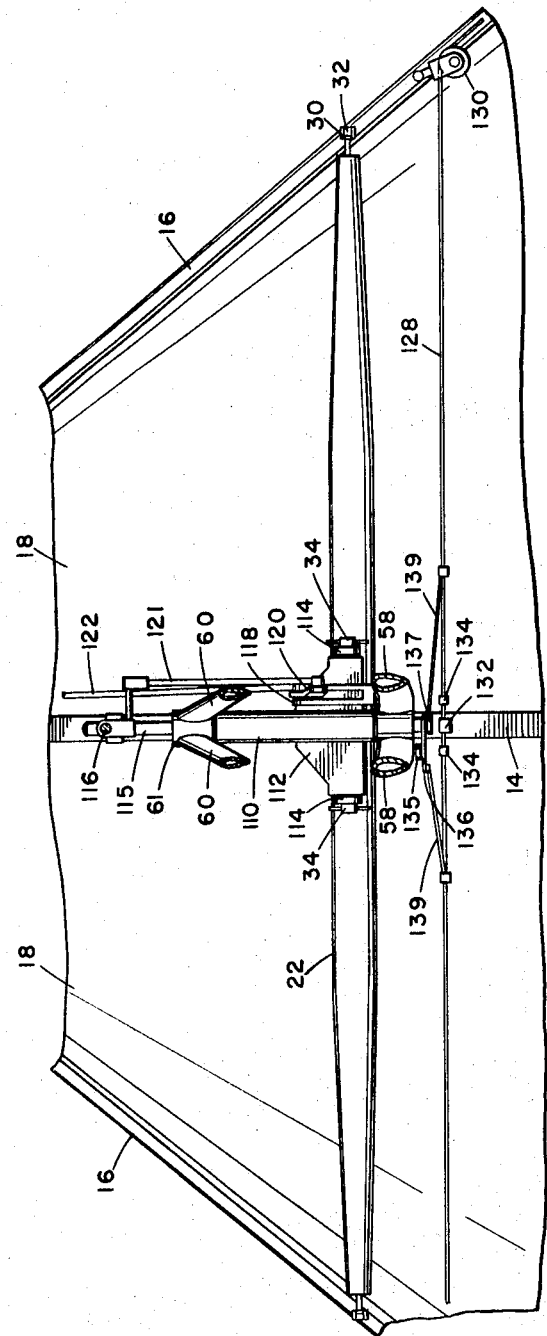
INVENTORS
PETER F. GIRARD
FRED LANDGRAF
BY
Knox & Knox

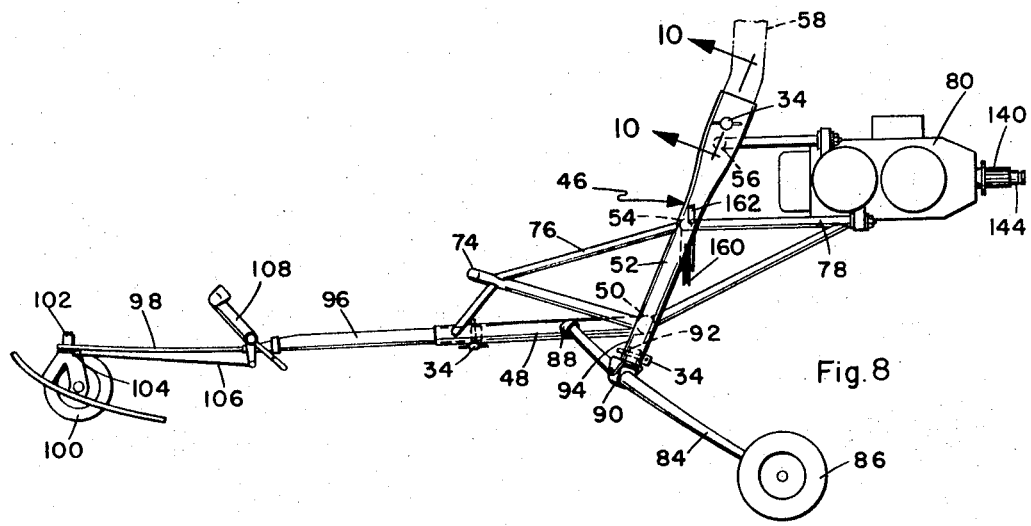
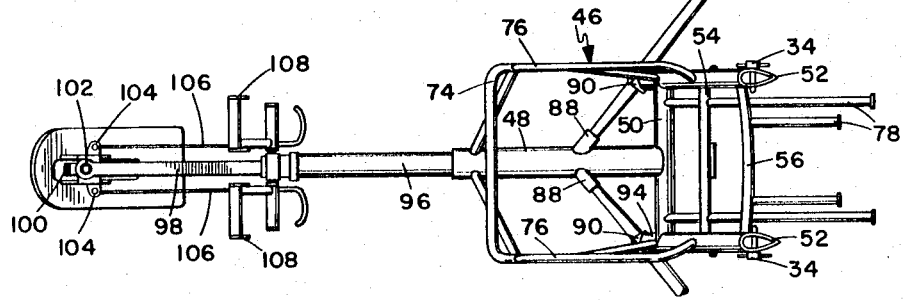
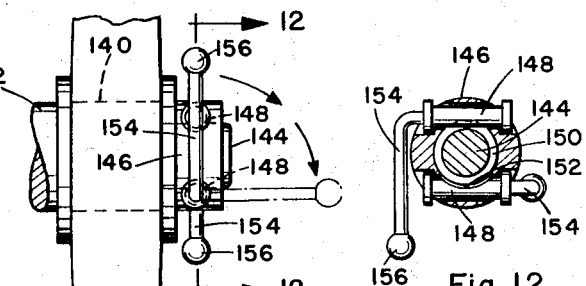
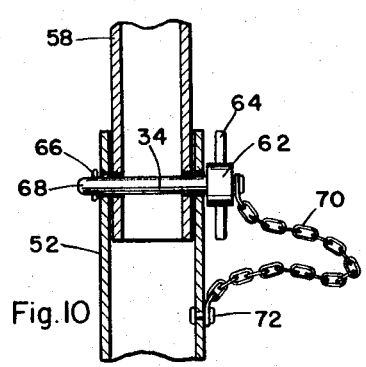

United States Patent Office 3,361,388
Patented Jan. 2, 1968

3,361,388
DEMOUNTABLE AIRCRAFT WITH FLEXIBLE WING
Peter F. Girard, La Mesa, and Fred Landgraf, San Diego, Calif., assignors to The Ryan Aeronautical Co., San Diego, Calif.
Filed Mar. 7, 1966, Ser. No. 532,445
3 Claims. (Cl. 244—48)

ABSTRACT OF THE DISCLOSURE

The aircraft is a lightweight minimal structure aircraft with a foldable flexible wing and an airframe which can be quickly dismantled, without tools, into units easily handled by one person and of a size which facilitates passage through a small opening, such as the hatch of a submarine or aircraft. A very simple control system is incorporated into the airframe in a manner which is adapted to the demountable structure, yet maintains its alignment during dismantling and re-assembly, the assembly also being possible by one person without tools.

Figure 1:
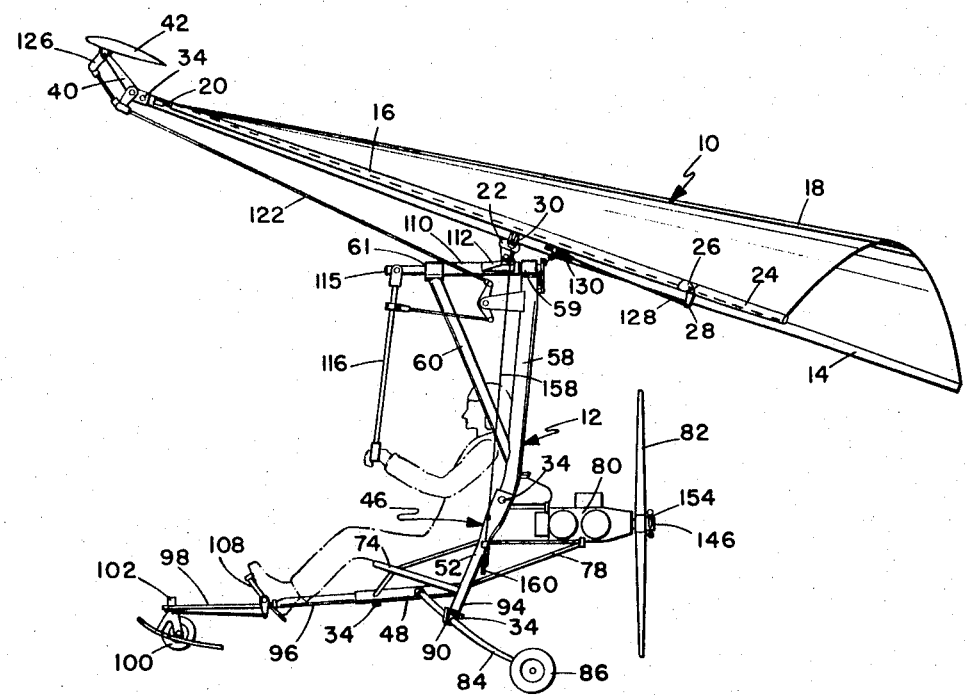

The present invention relates to aircraft and specifically to a demountable aircraft with a flexible wing.

The primary object of this invention is to provide a lightweight aircraft having a flexible wing, which can be folded, and an airframe which can be dismantled into a few basic units, the largest unit being readily handled by one person and all components being small enough to be carried in a vehicle, or loaded through a small hatch of an aircraft, ship or submarine.

Another object of this invention is to provide an aircraft incorporating a very simple control system especially adapted to the demountable nature of the structure and which requires minimum actuating forces, yet is stable and easily controllable under all flight conditions.

Another object of this invention is to provide an aircraft which can be completely dismantled into its basic components, or re-assembled, by one person without tools of any kind.

Another object of this invention is to provide an aircraft in which all components are fully accessible for servicing or repair.

Figure 2:
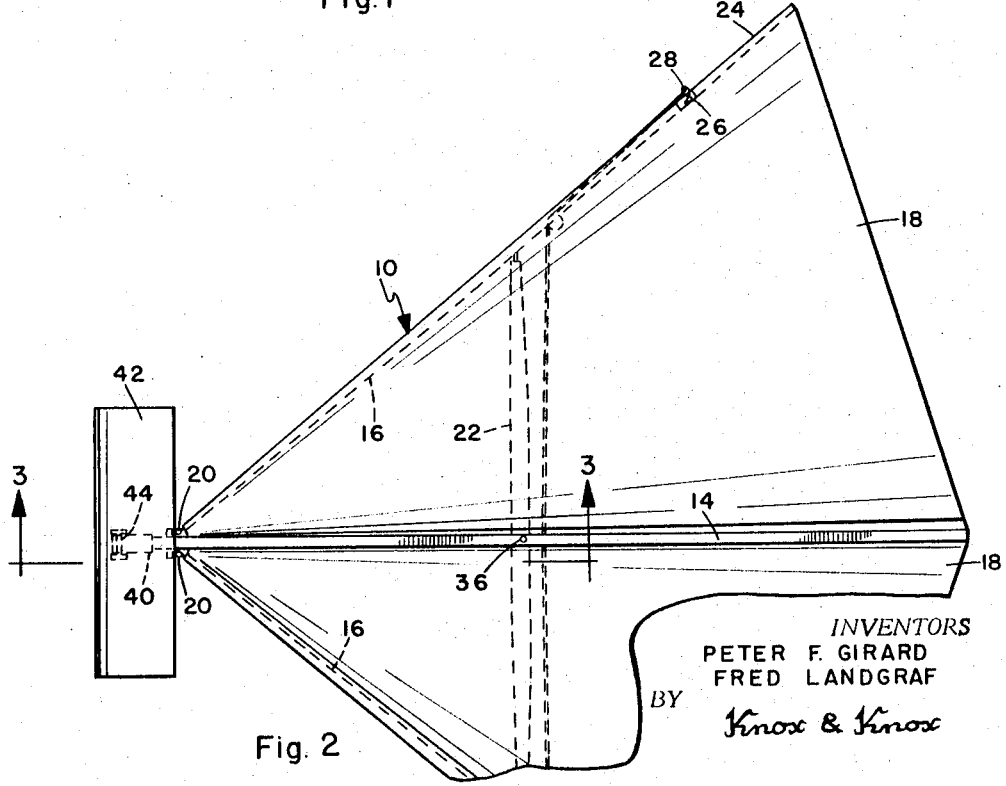

The aircraft and details of its structure are illustrated in the drawings, in which:

FIGURE 1 is a side elevation view of the aircraft;
FIGURE 2 is a top plan view of the wing assembly;
FIGURE 3 is an enlarged sectional view taken on line 3—3 of FIGURE 2;
FIGURE 4 is a sectional view taken on line 4—4 of FIGURE 3;
FIGURE 5 is an enlarged detail view taken in the direction of arrows 5—5 in FIGURE 4;
FIGURE 6 is a somewhat diagrammatic view of the roll control system;
FIGURE 7 is a sectional view taken in the direction of arrows 7—7 in FIGURE 4;
FIGURE 8 is an enlarged side elevation view of the airframe structure;
FIGURE 9 is a top plan view of the structure shown in FIGURE 8;
FIGURE 10 is an enlarged sectional view taken on line 10—10 of FIGURE 8;
FIGURE 11 is an enlarged side elevation view of the propeller hub attachment means; and
FIGURE 12 is a sectional view taken on line 12—12 of FIGURE 11.

Similar characters of reference indicate similar or identical elements and portions throughout the specification and throughout the views of the drawings.

The aircraft comprises a wing 10 from which is suspended an airframe 12 to carry a pilot or any suitable payload, a pilot being indicated in position in FIGURE 1. Wing 10 is of typical flexible wing construction, having a rigid longitudinal keel 14, with leading edge members 16 extending outwardly and rearwardly from the forward end of the keel, the lifting surfaces taking the form of flexible panels 18 of generally triangular shape secured along the keel and leading edge members and extending therebetween. The leading edge members 16 have pivotal connections 20 to the keel 14 at their forward ends to facilitate folding and are held in extended position by a spreader bar 22 secured transversely to the keel. The rear end of each leading edge member 16 comprises an aileron arm 24 and is pivotally mounted on a hinge 26 to swing substantially in the plane of the flexible wing panel 18 attached thereto when the wing is in extended flight condition. Each aileron arm 24 has a control horn 28 extending downwardly generally radial to the axis of hinge 26. Each end of spreader bar 22 has a fork 30 and is pivotally connected to a fitting 32 on the adjacent leading edge member 16, the coupling being held by a quick release pin 34, as in FIGURE 6.

Spreader bar 22 is attached to keel 14 by a single bolt 36, at a point slightly forward of the wing's aerodynamic center of lift, as indicated at A.C. in FIGURE 3.

On the forward end of keel 14 is a nose cap 38 held by a quick release pin 34 and carrying a forwardly and upwardly extending support post 40, on top of which is mounted a canard wing 42 pivoted on a horizontal hinge pin 44 perpendicular to the keel. The canard wing 42 can thus vary its angle of attack with respect to the main wing and functions as a control surface, as hereinafter described.

Airframe 12 is constructed around a base frame 46 having a longitudinal central spine 48 with a transverse cross bar fixed to the rear end thereof. At opposite ends of cross bar 50 are upwardly extending strut posts 52 braced apart by vertically spaced cross members 54 and 56. The structure is basically tubular for minimum weight with maximum strength and to simplify interconnection of the various components. Fitting into the top of strut posts 52 are upright wing struts 58, the upper ends of which are fixed to a rear bearing 59 having an axis substantially parallel to the longitudinal reference axis of the aircraft.

Extending upwardly and forwardly from adjacent the lower end of each wing strut 58 is a support strut 60 making a generally Y-shaped frame, the upper ends of both support struts being fixed to a front bearing 61 coaxial with bearing 59.

Wing struts 58 are held in the strut posts 52 by quick release pins 34, a detail of which is shown in FIGURE 10. The quick release pin 34 has an enlarged head 62 provided with a T-bar 64 for ease of handling and has spring loaded detents 66 at the tip 68, which lock the pin in place until forcibly removed. A flexible chain 70, or similar means, is attached at one end to head 62, the other end of the chain being secured to adjacent structure by a rivet 72, or other means, so that the pin is retained in place when the structure is dismantled. This type of quick release pin, or its equivalent, is well known in the aircraft industry and is readily available in many sizes. A number of such pins are used to assemble the present aircraft and all are designated by the numeral 34 for simplicity, since the only variation is that of size to suit the particular joint. The retaining means of FIGURE 10 is typical of all the quick release pins.

Extending forward from strut posts 52 is a seat frame 74 suitably supported by reinforcing members 76. Any form of seat and safety harness may be used, a seat type parachute being suitable as a cushion in the open frame.

At the rear of base frame 46 are engine mountings 78 carrying an engine 80, which is illustrated as a small internal combustion engine driving a pusher propeller 82. The specific engine mounting will depend on the engine used, that shown being typical.

On each side of base frame 46 is a main landing gear leg 84 having a wheel 86 at the outer end, the inner end of the leg seating in a socket 88 fixed to spine 48. Each leg 84 is supported by a bracket 90 having a plug portion 92 which fits into a lower extension 94 of strut posts 52, and is held by a quick release pin 34.

Plugged into the forward end of spine 48 and held in place by a quick release pin 34 is a front boom 96 having a resilient nose wheel leg 98 projecting forwardly therefrom. On the forward end of leg 98 is a nose wheel 100 steerable on a bearing 102 and having steering arms 104, which are connected by cables 106 to foot pedals 108 pivotally mounted on boom 96.

Rotatably mounted between bearings 59 and 61 is a roll hinge sleeve 110 carrying a pitch hinge bracket 112 which is pivotally connected to brackets 114 on spreader bar 22, equally spaced on opposite sides of keel 14. The pivotal connection is made by quick release pins 34 on an axis parallel to spreader bar 22.

Coaxially rotatably mounted through sleeve 110 is a torque tube 115, on the forward end of which is a downwardly extending control stick 116 hinged to swing in a plane parallel to the torque tube axis. On one wing strut 58 is a bracket 118 on which is pivotally mounted a bellcrank 120, one end of the bellcrank being pivotally connected to control stick 116 by a link 121. From the other end of bellcrank 120 a connecting rod 122 leads to a transfer arm 123 pivotally mounted on support post 40, and through a link 124 to a control horn 126 extending downwardly from canard wing 42, so that fore and aft motion of the control stick causes changes in angle of attack in the canard wing as indicated in the broken line position in FIGURE 3. Both ends of connecting rod 122 are secured by quick release pins 34, as also is the coupling of link 121 to control stick 116.

Aileron arms 24 are interconnected by a balance cable 128 which is connected to one control horn 28, runs forward to a pulley 130 mounted on the leading edge member 16, across the wing substantially parallel to spreader bar 22, around another pulley 130 and back to the other control horn 28, in a symmetrical arrangement. At the center the balance cable 128 passes through a guide 132 fixed below keel 14 and stops 134 are secured to the cable on either side of the guide to limit the motion of the cable, thus limiting the up and down throw of the aileron arms 24.

Pivotally mounted on one wing strut 58 and extending upwardly is a hinge arm 135, at the top of which is a coupling 136 held by a quick release pin 34. Projecting downwardly from the rear end of torque tube 115 is a control arm 137 which is connected by a link 138 to hinge arm 135 intermediate its ends. From the coupling 136 actuating cables 139 extend to the balance cable 128 on opposite sides of keel 14. When control stick 116 is moved to one side the aileron arm 24 on the opposite side is pulled downwardly, while on the side to which the stick moves the aileron arm rises, as in the broken line position in FIGURE 6. Only a downward pull is required, since the areodynamic load on the wing tends to pull the aileron arms up. The lift differential caused by the resultant unsymmetrical wing contours causes the required turning action. This particular roll control system is fully described in co-pending application Ser. No. 320,995, filed Nov. 4, 1963, entitled Roll Control System for Flexible Wing Aircraft. The arrangement is especially suitable for the present aircraft due to the simplicity of the mechanism and the low control forces necessary.

To limit roll control to a safe range the roll freedom of the wing about the axis of sleeve 110 is limited. A flying wire 158 extends from one end of spreader bar 22, down and around a pulley 160 secured on the airframe below cross member 54 and up to the other end of the spreader bar. The flying wire 158 passes through guides 162 fixed on strut posts 52 and is provided with stops 164 which limit the motion of the wire through the guides. The ends of the flying wire may be secured at the forks 30 by the quick release pins 34 for ease of detachment.

The use of the canard wing 42 provides a forward control surface which counteracts the inherent nose down pitching of a flexible wing at very low speeds. In addition, the location of the canard wing at a long moment arm from the wing pitch pivot, at brackets 114, provides a powerful control surface to cause the required pitch control in response to the control stick motion, with a minimum of effort. When control stick 116 is moved forward, as indicated in FIGURE 3, the canard wing 42 is pitched down and its angle of attack reduced. The resultant reduction in lift at the forward end causes the required downward pitching action of the main wing until, through the connecting rod 122 which is held in the selected position by the control stick, the canard wing 42 is brought back to its nominal neutral angle of attack relationship with the main wing. At this position the wing assembly is again aerodynamically stable and the aircraft will fly at the new pitch setting.

By pulling the control stick back the canard wing increases its angle of attack, the resultant increase in lift causing the main wing to pitch up. Thus the controls are instinctively similar to those of a conventional aircraft as regards results.

It should be noted that the distance between the pitch pivot of control stick 116 and the attachment of link 121 thereto is considerably greater than the length of control horn 126. This difference in lever arms ensures that the angular motion of the canard wing 42 is greater than that of the control stick. The system provides very effective automatic stability, since any pitching motion of the wing due to flight conditions which is not intentionally applied by the control stick (that is, the control stick is held stationary), will cause a change in angle of attack between the canard wing and the main wing. The resultant lift differential at the nose will cause the wing assembly to return to neutral stability. Due to the increased ratio of angular motion of the canard wing relative to the main wing, the canard wing is very sensitive to small deviations of the main wing about the pitch axis and will provide rapid response. By this means pitch fluctuations are effectively damped and the aircraft is very stable.

To add to the compactness of the dismantled aircraft the propeller 82 is made removable. One suitable arrangement for accomplishing this is shown in FIGURES 11 and 12. The propeller 82 is mounted on the splined end 140 of propeller shaft 142 in the usual manner, but an extension stub 144 of the propeller shaft projects through a locking hub 146 on the rear face of the propeller. Mounted chordally through the locking hub 146 and one on each side of the axis thereof are two locking cams 148, basically cylindrical and axially rotatable in the hub. Extension stub 144 has a groove 150 in which the locking cams 148 seat to prevent axial displacement of the propellor, but each cam has an arcuate notch 152 corresponding to the diameter of the extension stub so that, when the cams are rotated to a certain position, the notches are aligned with the extension stub and the propeller can be removed. To operate the locking cams 148 each is provided with a handle 154 fixed radially to the cam and oriented so that when the handle is outwardly disposed, substantially along the propeller blade, the cams are locked in the groove 150. When the handles are swung rearwardly generally parallel to the propeller shaft axis, the cams are turned to their unlocked positions. On the outer end of each handle 154 is a knob 156 serving as a fly-weight. When the propeller is turning the centrifugal force keeps the arms extending outwardly and ensures that the propeller will remain locked in place. Additional controls, such as the engine throttle, fuel shutoff, wheel brakes and the like are conventional and have been omitted, since their placement will depend on the equipment used and the function of the aircraft.

To dismantle the aircraft the pins 34 are securing forks 30 to fittings 32 on the leading edge members 16 are first removed, then the leading edge members are folded in, about pivotal connections 20, to rest on the spreader bar 22 alongside keel 14. Canard wing 42 is then removed by pulling the quick release pin from the nose cap 38 and by similarly disconnecting the connecting rod 122. The quick release pins are removed at the junction of link 121 with control stick 116 and at the coupling 136 to complete disconnection of the control system. The wing can now be rotated about bolt 36 until the keel 14 is approximately parallel to spreader bar 22, after which the quick release pins are pulled from brackets 114 to detach the wing from the airframe. The folded wing structure can then be wrapped in the flexible panels to form a neat package.

Propeller 82 is removed by swinging handles 154 to the rear and wing struts 58 are removed from strut posts 52 by pulling the quick release pins. The airframe is then tilted back until the weight is carried on main wheels 86 and the propeller shaft, so that the nose wheel assembly can be detached by pulling the quick release pin from spine 48. The remaining assembly is temporarily balanced on the propeller shaft and the main landing gear removed by pulling the quick release pins from strut post extensions 94.

The disassembly and subsequent re-assembly are carried out entirely without tools, the only fastenings being manually operated quick release pins and the propeller locking handles. The heaviest single component is the base frame 46 with the engine 80 attached, but in the small aircraft shown as the practical embodiment of the design, this can be handled by one person and is sufficiently compact to pass through a small hatch or into a vehicle. The engine is omitted from FIGURE 9 for clarity but would remain attached to the base frame 46 in actual use. Landing gear components and the wing struts are small and easily handled, while the folded wing although long, is of small cross section and can be passed through a small hatch or tied on top of a vehicle.

It will be evident that the aircraft is versatile in its application due to the ease of transportation and extreme simplicity of operation and maintenance. The compactness of the dismantled components makes it feasible to carry the aircraft aboard a submarine for use in long range observation. The high lift and low speed efficiency of the flexible wing will allow the aircraft to take off from a large submarine deck, although conventional rocket type boost may be used if necessary.

It is understood that minor variation from the form of the invention disclosed herein may be made without departure from the spirit and scope of the invention, and that the specification and drawings are to be considered as merely illustrative rather than limiting.

We claim:
1. An aircraft, comprising:
   an airframe having a wing and quick release means securing said wing to said airframe;
   said wing having a longitudinal central keel, leading edge members foldably connected to and extending rearwardly from the forward end of said keel, flexible lifting panels secured along and between said keel and said leading edge members, a spreader bar attached transversely to said keel and having outer end portions connected to and supporting said leading edge members;
   said wing being pivotally attached to an upper portion of said airframe for variation in angle of attack relative to the airframe;
   a movable control surface mounted on said wing longitudinally remote from the pivotal connection of the wing to said airframe, said control surface being pivotal on an axis substantially parallel to the pivotal axis of the wing;
   said airframe having upwardly extending struts;
   a sleeve mounted on the upper ends of said struts for rotation about a roll axis substantially parallel to the longitudinal axis of the aircraft;
   a pitch hinge bracket on said sleeve;
   said spreader bar having brackets thereon;
   and quick release pin means pivotally securing said pitch hinge bracket to said spreader bar brackets on an axis substantially parallel to said spreader bar.

2. An aircraft according to claim 1, and including a torque tube coaxially rotatably mounted in said sleeve, a control stick pivotally suspended from said torque tube to swing in a plane substantially parallel to the axis thereof;
   said control stick being quickly releasably coupled to said control surface to vary the angle of attack thereof relative to said wing.

3. An aircraft according to claim 2, wherein said leading edge members have rear end portions pivotal to swing in a plane substantially parallel to the plane of the attached flexible lifting panels to raise and lower the rear outer portions of the lifting panels;
   said control stick being further pivotal with said torque tube to swing in a plane substantially perpendicular to the first mentioned plane of motion thereof;
   and quick release means coupling said control stick to said rear end portions to raise and lower said leading edge members differentially.

References Cited
UNITED STATES PATENTS

| | | | |
|---|---|---|---|
| 2,430,793 | 11/1947 | Wells | 244—48 X |
| 3,017,137 | 1/1962 | Helmke et al. | 244—2 |
| 3,135,483 | 6/1964 | Girard. | |

MILTON BUCHLER, *Primary Examiner.*

FERGUS S. MIDDLETON, *Examiner.*

B. BELKIN, *Assistant Examiner.*